United States Patent [19]

Shutic et al.

[11] Patent Number: 5,261,934
[45] Date of Patent: Nov. 16, 1993

[54] POWDER COLLECTION METHOD AND APPARATUS WITH ISOLATED FILTER PULSING AND COMPRESSION MOUNTED CARTRIDGES

[75] Inventors: Jeffrey R. Shutic, Wakeman; John F. Carlson, Sheffield Lake, both of Ohio

[73] Assignee: Nordson Corporation, Westlake, Ohio

[21] Appl. No.: 852,575

[22] Filed: Mar. 17, 1992

[51] Int. Cl.$^5$ ............................................. B01D 46/04
[52] U.S. Cl. ........................................ 95/280; 55/302; 55/498
[58] Field of Search .............. 55/96, 302, 273, 484, 55/498, 284

[56] References Cited

U.S. PATENT DOCUMENTS

| | | | |
|---|---|---|---|
| 3,870,375 | 3/1975 | Duncan et al. | 302/42 |
| 4,218,227 | 8/1980 | Frey | 55/302 |
| 4,277,260 | 7/1981 | Browning | 55/273 |
| 4,292,053 | 9/1981 | Remillieux | 55/273 |
| 4,319,897 | 3/1982 | Labadie | 55/302 |
| 4,331,459 | 5/1982 | Copely | 55/273 |
| 4,395,269 | 7/1983 | Schuler | 55/302 |
| 4,545,324 | 10/1985 | Browning | 118/634 |
| 4,559,138 | 12/1985 | Harms | 55/484 |
| 4,704,144 | 11/1987 | LeBlanc | 55/300 |
| 4,723,505 | 2/1988 | Wilson et al. | 427/195 |
| 4,775,398 | 10/1988 | Howeth | 55/302 |
| 4,871,380 | 10/1989 | Meyers | 55/302 |
| 4,910,047 | 3/1990 | Barnett et al. | 427/195 |
| 4,955,996 | 9/1990 | Edwards et al. | 55/302 |
| 5,002,594 | 3/1991 | Merritt | 55/302 |

Primary Examiner—Charles Hart
Attorney, Agent, or Firm—Howard M. Cohn

[57] ABSTRACT

An apparatus and method of dislodging particles of powder material from the exterior of cartridge filters in the powder recovery unit of a powder spray system. In the powder recovery unit, particles of powder material collect on the cartridge filters as filtered air enters the hollow interior of the cartridge filters and moves toward the open tops thereof. Periodically, the flow rate of the filtered air through a cartridge filter is reduced and a pulse of air is directed into the open top of that cartridge filter, in a direction opposite to the normal direction of movement of the filtered air, to dislodge the particles from the cartridge. In addition, the cartridge filters are vertically disposed and compression mounted in such a way that the cartridge support hardware does not obstruct the air flow through the top opening of the cartridge filter.

35 Claims, 5 Drawing Sheets

POWDER COLLECTION METHOD AND APPARATUS WITH ISOLATED FILTER PULSING AND COMPRESSION MOUNTED CARTRIDGES

FIELD OF THE INVENTION

This invention relates to powder spray systems having powder recovery capability, and more particularly, to a powder collector having cartridge filters for the recovery of oversprayed powder.

BACKGROUND OF THE INVENTION

Powder spray systems are well known in the art and representative systems are disclosed, for example in U.S. Pat. Nos. 4,910,047 and 4,723,505, both assigned to Nordson Corp. of Westlake, Ohio, the assignee of this invention. As disclosed in these patents, the practice of powder coating involves spraying a powdered coating material onto a substrate and thereafter heating the substrate and the powder so that the powder melts. When subsequently cooled, the melted powder forms a solid, continuous coating on the substrate. In many instances, an electrostatic charge is applied to the sprayed powder and the substrate is electrically grounded to increase the quantity of powder which attaches to the substrate and to assist in retaining the powder thereon.

Powder deposition is usually performed in a spray booth, i.e., an enclosure wherein any oversprayed powder which is not deposited on the substrate can be collected. Conventionally, the containment of oversprayed powder in the spray booth is aided by an exhaust system which creates a negative pressure within the spray booth and draws the powder entrained in a stream of air out of the spray booth into a powder recovery unit, also called a powder collector. In the powder collector, the particles of powder are separated from the air by a filter media, collected in a hopper and then usually returned to the powder supply for sieving and recirculating to the spray gun.

Early U.S. Pat. No. 3,870,375 shows the use of filter bags for the filtering media. Typically, multiple filter bags were contained in a bag house in these systems. The openings in the top of the bags were connected to a clean air plenum which is kept under negative pressure by an exhaust fan. In this way, as air entrained powder is drawn towards and contacts the bag, the powder would remain on the bags exterior, while the filtered air would flow into the interior of the bag, into the clean air plenum, and then through the exhaust fan, and final filter.

In the 3,870,375 patent, an oversized bag house is employed which permits one entire section of the bag house to be taken off line (i.e. disconnected or sealed off from the exhaust fan) at any given time without disrupting the ability of the bag house to continue to draw enough oversprayed powder into the collector so that the powder does not start to escape through the booth openings into the work environment. With a section of the bag house sealed off from the exhaust fan, the bags in that section would not be under the influence of the negative pressure, or draw from the exhaust fan, and the bags could be mechanically vibrated to dislodge powder collected on the exterior of the bags so that the dislodged powder could be collected in the collection hopper underlying the bags. In this type of system, it was necessary to completely seal the bags off from the exhaust fan during cleaning, because if the bags felt even a small draw from the fan the powder would be very difficult to dislodge by vibration.

U.S. Pat. No. 4,218,227 shows and describes the replacement of bags by cylindrical, pleated paper cartridge filters. With the advent of cartridge filters, powder collected on the exterior of the filters was knocked off not by mechanical vibration per se, but instead by a brief pulse of air directed down into the interior of the cartridge in the reverse direction to the normal filtered air flow through the cartridge caused by the exhaust fan. In these systems, the reverse cleaning pulse would momentarily overcome the exhaust fan air flow through the cartridge to knock the powder off the exterior of the cartridge and down into the collection hopper. Typically, cartridges are cleaned in sequence, one or two at a time, so that the overall ability of the collector to collect oversprayed powder from the booth and keep it from escaping from the booth into the work environment is not impaired.

A problem with this type of prior air, pulse cleaning system, however, is that all the cartridge filters are connected to a common clean air chamber which is constantly under the force of the exhaust fan to draw air entrained with oversprayed powder through the filters, even while the filters are being pulse cleaned. This causes some particles of powder which were just cleaned off the outer surface of a cartridge filter by a high pressure pulse to be drawn right back onto the cartridge following the end of the pulse. Also, the particles of powder which are cleaned from one cartridge are sometimes re-deposited onto a neighboring cartridge. The consequence of this problem is that the cartridges do not get a thorough cleaning, the pressure of the pulse air has to be maintained at a high level which increases the pulse noise of the system and the cartridges have to be pulse cleaned more often.

More recently, U.S. Pat. No. 5,002,594 issued which attempts to improve upon cartridge filter systems by enclosing the top of the cartridge and the pulsing mechanism by a noise shield during pulsing to reduce the noise level of the pulse. While this design may reduce the noise level of the pulse, it blocks air surrounding the top of the cartridge from being entrained with the pulse which according to the teachings of the present invention is a serious drawback to this design. The reason for this is that according to the present invention, it is necessary to permit air surrounding the top of the cartridge to be entrained with the pulse to generate a high enough volume pulse to effectively dislodge powder from the cartridge exterior. Moreover, by completely sealing the top of the cartridge, or even the area of the air plenum above the ™ top of the cartridge, not only is air entrainment prevented or retarded, but in addition, a vacuum, or partial vacuum condition can be set up in the cartridge or air plenum during pulsing which works against the pulsing force and makes the pulse less effective.

Another problem with the cartridge pulsing system of the 5,002,594 patent, as with the other prior art cartridge pulsing systems as noted above is that powder particles pulsed off one cartridge can be immediately drawn onto an adjacent cartridge requiring the cartridges to be cleaned more frequently.

Aside from the factors relating to the pulse cleaning of the cartridges, another factor in the design of powder collectors is the manner in which the cartridge filters are mounted within a powder recovery chamber. Cartridge filters must be periodically replaced because of the gradual deterioration of the filters and filter leaks caused by the substantial forces generated by the pressures and flow rates of the air in both directions through the cartridge. The accessibility and ease of replacement of the filters is therefore a very important consideration. Further, when a filter is installed, it must be tightly mounted so that no air leaks exist between the collection chamber containing the unfiltered, particle entrained air and the clean air chamber. Conversely, the filter cannot be mounted so tightly that the filter cartridge or gasket at either end thereof is overcompressed and damaged to create an air leak. When particles of powder escape through an air leak into the clean air plenum, any downstream filter, specifically the final filter which is designed to filter extremely small sized particles, quickly clogs causing a shutdown of the entire powder coating operation.

The prior art cartridge filters were sometimes mounted more or less horizontally within a powder recovery chamber, as disclosed, for example in U.S. Pat. No. 4,395,269, U.S. Pat. Nos. 4,723,505 and 4,871,380.

Other cartridges have been vertically mounted, as disclosed, for example in U.S. Pat. Nos. 4,910,047 and 4,955,996. Typically, vertically mounted filter cartridges, are mounted from their top flange, as disclosed in the 4,910,047 and 4,955,996 patents or held in compression by means of a bolt extending through a hole in the bottom end cap of the cartridges as shown in FIG. 4 of U.S. Pat. No. 4,218,227.

A problem with the prior art, vertically mounted cartridge filters is the loss in cartridge surface area available for air flow and reverse jet pulsing at the very top of the cartridge due to the placement of structural components at the top opening of the cartridge which are required for supporting the filter vertically. These structural components have blocked or shadowed the pulse at the top of the cartridge preventing it from being effectively cleaned. Consequently, additional filter cartridges were required to compensate for this loss of filter surface area. Also, the installation of the prior art, vertical filters has typically been a tedious, frustrating process especially for a single installer. Accordingly, the installation typically required two installers, one on the side of the clean air chamber and the other on the spray booth side of the powder collector.

Another problem with the installation of the prior art, vertically mounted cartridge filters has been the tendency of the installer to over tighten the bolt extending through the cartridge with the result that the filter cartridge becomes deformed or otherwise damaged causing a leak.

OBJECTS AND SUMMARY OF THE INVENTION

It is an object of the present invention to provide an apparatus and method for cleaning the cartridge filters of a powder collection unit in a powder coating system which obviates the problems and limitations of the prior art systems.

It is another object of the present invention to provide an apparatus and method for cleaning the cartridge filters of a powder collection unit in a powder coating system which effectively cleans the cartridge filters, permits a reduction in the number of times and the period between times which the cartridge filters must be cleaned and reduces the pressure of the air pulse needed to clean the cartridge filters.

It is a yet further object of the present invention to provide an apparatus for compression mounting vertically oriented, filter cartridges which are easily installed by a single installer and which provides a simple and reliable seal.

In accordance with the invention, a powder spray system for powder coating of substrates in a spray booth comprises a powder recovery chamber divided into a plurality of separate enclosures each having at least one filter cartridge mounted therein to collect air-entrained, oversprayed powder from the spray booth. A plurality of pulse plenum chambers, each communicating with one of the separate enclosures has a high pressure air pulse generating device therein for sequentially directing a pulse of air into the at least one filter cartridge to clean it. An exhaust fan communicates with each of the pulse plenum chambers for drawing the air-entrained, oversprayed powder into the plurality of separate enclosures so that the oversprayed powder is collected on the at least one cartridge filter and filtered air is drawn through the plurality of separate pulse plenum chambers and into the exhaust plenum device. A mechanism selectively isolates one of the pulse plenum chambers from the exhaust plenum by substantially reducing the draw on the exhaust plenum from the exhaust fan whenever the pulse cleaning device within the isolated pulse plenum chamber directs a pulse of air into the at least one cartridge filter to clean it.

Further, in accordance with the invention, a method of dislodging particles of powder material from the exterior wall of at least one cartridge filter in the powder recovery unit of a powder spray system comprises the following steps: A flow of air-entrained particles of powder material is directed to the exterior of the at least one cartridge filter so that the particles of powder material collect on the exterior and the air passes through the exterior surface and enters the hollow interior of the at least one cartridge filter as filtered or clean air. Then, the filtered air is moved through the hollow interior of the at least one cartridge filter toward the open top thereof. Next, the movement or flow rate of the filtered air through the hollow interior of the at least one cartridge filter is periodically restricted or reduced. Finally, a pulse of air is directed into the open top of the at least one cartridge filter, in a direction opposite to the normal direction of movement of the filtered air through the hollow interior of the cartridge filter, When the movement of the filtered air through the hollow interior of the cartridge filter is being restricted, to more effectively pulse off or remove from the exterior of the cartridge powder which has collected thereon.

Also in accordance with the invention, a powder recovery chamber comprises an elongated, hollow enclosure having a top wall with an inlet opening to a clean air plenum therethrough at one end, side walls and a frame member across the opening at the other end. One or more cartridge filters are disposed vertically between the top wall and the opening at the other end. In the preferred embodiment, dual cartridge filters are stacked vertically with the top cartridge having an open end cap at both ends and the bottom cartridge having one open end cap and one closed or solid end cap. Both cartridges include a gasket or seal around their top end cap openings. Alignment structure aligns the open end cap of the top cartridge concentrically with the inlet opening to the clean air plenum, and concentrically aligns the top cartridge with the bottom cartridge. A mechanism acts against the closed bottom end cap of the bottom cartridge to compress the bottom cartridge against the top cartridge and the top cartridge against the top wall so that the gasket around the top of the bottom cartridge seals around the open bottom of the top cartridge, and the gasket around the top of the top cartridge seals around the opening into the clean air plenum.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE INVENTION

Figure 1:
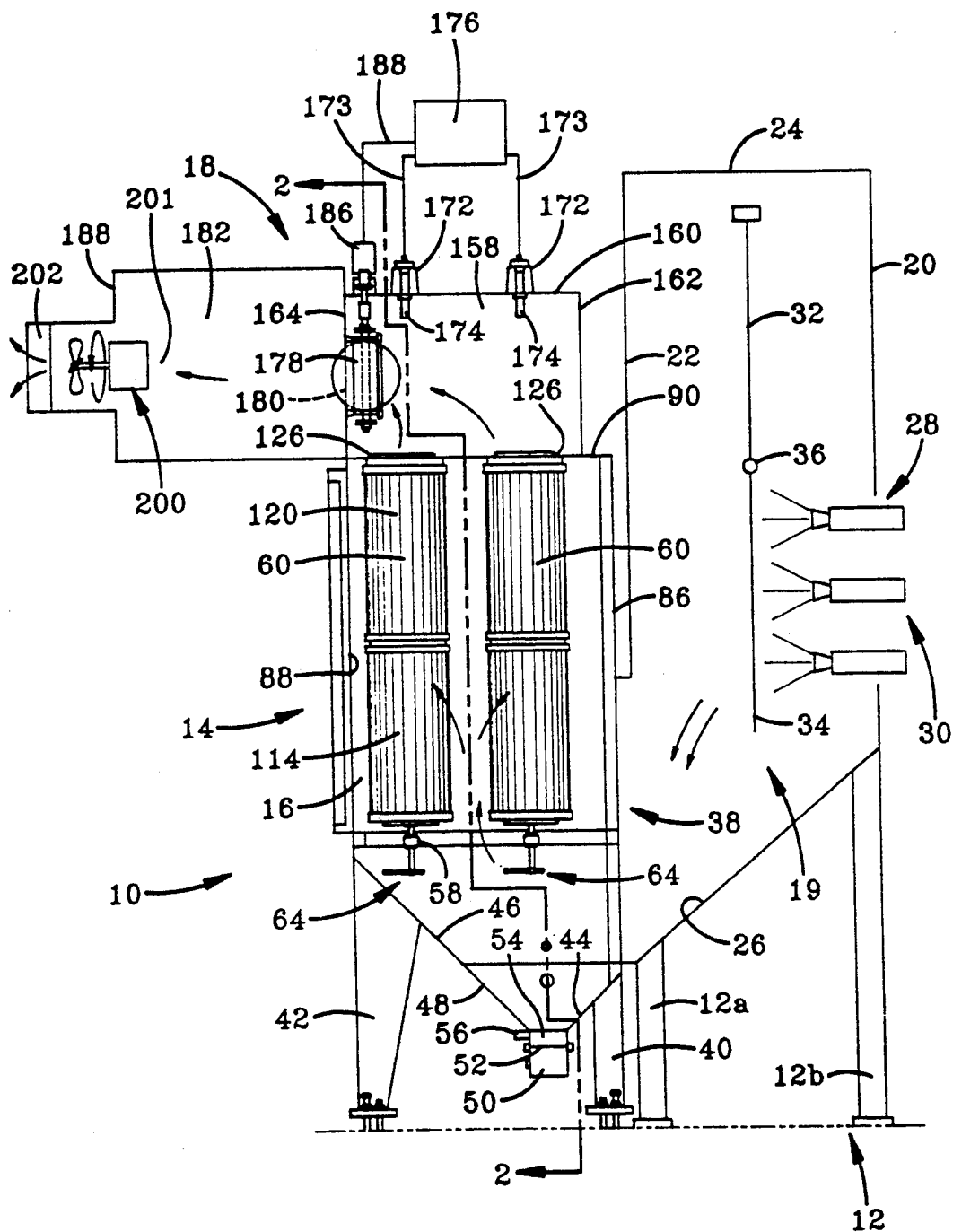
FIG. 1 is a side elevational view in cross section of a powder coating system incorporating the present invention.

Referring to FIG. 1, a powder coating system 10 is illustrated. The overall construction of the powder coating system 10 forms no part of this invention per se and is described only briefly herein.

Figure 2:
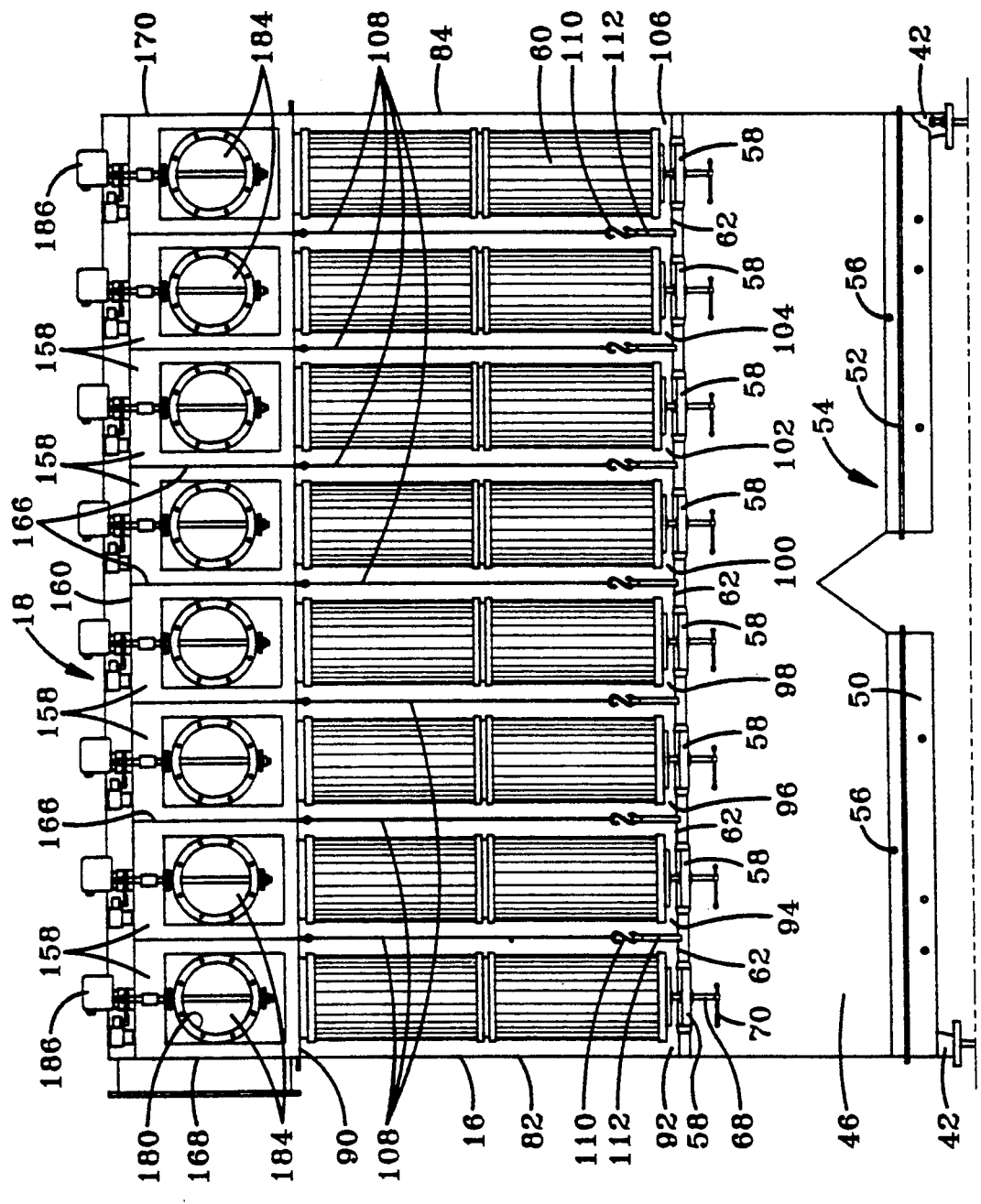
FIG. 2 is a view taken along lines 2—2 of FIG. 1.

The powder coating system 10 comprises a spray booth 12 and a powder collector unit 14 consisting of a powder recovery chamber 16 and a clean air chamber 18. The spray booth 12 is illustrated schematically and typically comprises an enclosed spray chamber 19 having side walls 20, 22, a ceiling 24 and a floor 26 which is inclined to funnel oversprayed powder which may settle on floor 26 into collector unit 14. Legs 12a and 12b support the booth 12. One or more gun openings 28 are provided in the side wall 20. Spray guns 30 connected to a powder supply and electrostatic charging system, not shown, project through opening 28 in the side wall 20 and are aimed at the interior of the spray chamber 19. A conveyor 32, supporting a workpiece 34 on a conventional fixture 36, moves the workpiece to be sprayed past the spray guns 30. An exhaust opening 38 in the side wall 22 provides a passageway to draw air-entrained, oversprayed powder into the powder recovery chamber 16, as illustrated in FIGS. 1 & 2.

The powder recovery chamber 16 of the powder collector unit 14 includes front and rear, upright legs 40 and 42, respectively, which support the side walls 44 and 46, respectively, of a powder collection hopper 48. Below the hopper 48 is a fluidizing air plenum 50 separated from hopper 48 by a fluidizing plate 52. A pump, not shown, pumps air into the air plenum 50 and through the plate 52 so that oversprayed particles collected within hopper 48 are fluidized. A collection trough 54 is located in the lowermost portion of the hopper 48, directly above the plate 52, to collect the powder. A pump, not shown, is connected to the collection trough through outlet 56 for pumping the collected powder back to the powder source for sieving and recirculation to the spray guns.

Across the top of the collection hopper 48 are a plurality of structural frame members 58, preferably one for every two pairs of stacked cartridge filters 60. The frame members are connected together by cross members 62. Preferably, at least two spaced cross members 62, are disposed between each pair of adjacent frame members 58.

Figure 3:
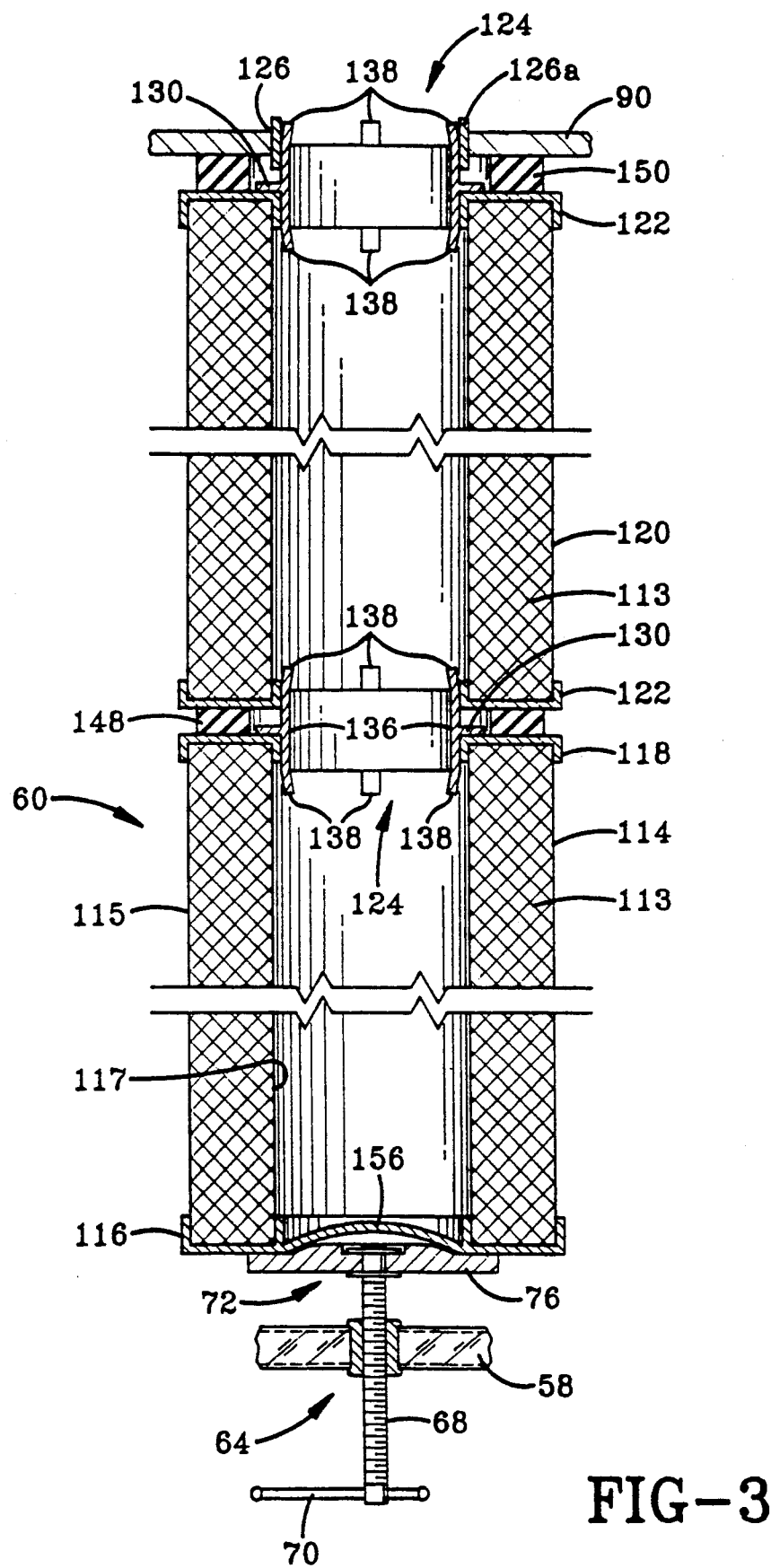
FIG. 3 is an enlarged fragmentary, cross-sectional, side elevational view of stacked cartridge filters in accordance with the present invention.
Figure 4:
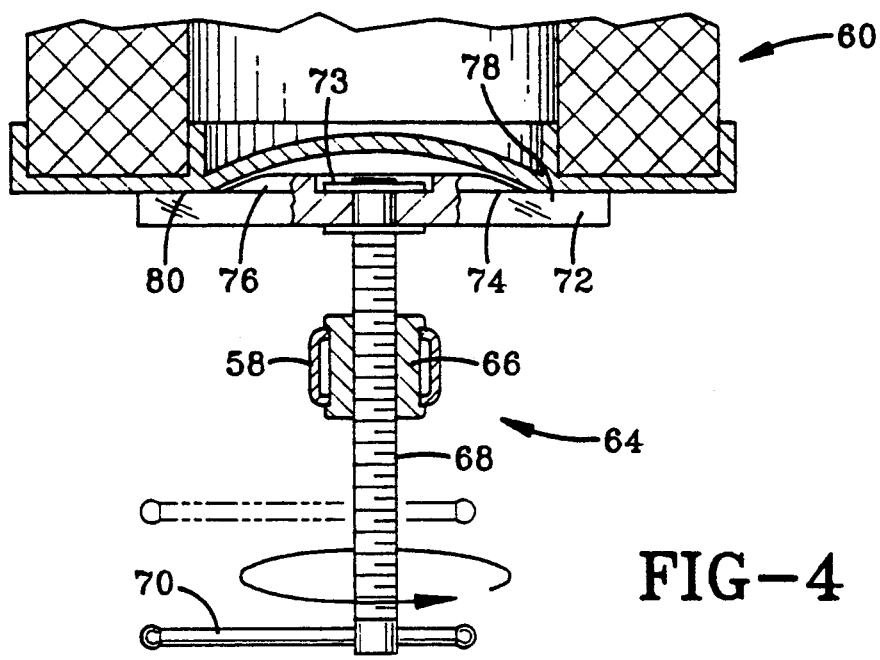
FIG. 4 is an enlarged, cross-sectional, side elevational view of a compression screw mechanism in accordance with the present invention.

Referring to FIGS. 3 and 4, there is illustrated a screw device 64 for securely mounting the cartridges 60 within the powder recovery chamber 16 as discussed hereinafter. The device 64 includes an internally threaded plug 66 which extends through and is secured to a frame member 58. An elongated, threaded screw 68 is threadedly received within the plug 66. At one end of the screw 68 is a handle 70 and at the other end is a pressure plate 72. The pressure plate 72 is secured to the screw 68 so as to freely rotate thereon. For example, a locking ring 73 can be disposed within a groove, not shown, on the upper end of screw 68 in FIG. 4. Upon the upper surface 74 of the pressure plate 72 is an upstanding rectangular plate 76, integrally formed into pressure plate 72, which is narrower than the width of the upper surface and thereby forms shoulders 78 and 80. The plate 76 is tightened against the bottom of the cartridges, as described hereinafter.

Referring again to FIGS. 1 and 2, the powder recovery chamber 16 includes side walls 82 and 84, front wall 86, rear wall 88 and top wall 90. The frame members 58 define the bottom of the chamber 16. The recovery chamber is divided into a plurality of separate, elongated hollow, cartridge enclosures 92,94,96,98,100,102,104 and 106 within the interior of the chamber 16, the enclosures are separated by flexible walls 108. Each flexible wall 108 extends substantially entirely between the front and rear walls 86 and 88. The upper edge of the wall 108 is secured to the top wall 90 by any desired means. The lower edge of the wall 108 is attached to the cross members 62 between the frame members 58 so that the wall 108 can vibrate during pulsing. In the preferred embodiment, the lower edge is attached by two or more elastic, stretchable cords 110 to an upstanding post 112 which in turn is affixed to the cross members 62. Typically, the walls 98 are constructed of a sheet of nonconductive, slippery material, such as for example polypropylene.

Within each hollow cartridge enclosure 92-106, four cartridge filters 60 are mounted in vertically stacked pairs. There are preferably two types of cartridge filters generally of the type disclosed in U.S. Pat. No. 4,871,380. These cartridges include an elongated hollow member 113 formed of a filter media, such as a cylindrically shaped, filtering wall with a pleated outer surface 115 and a hollow interior 117. The lower cartridge 114 has a closed end cap 116 and an open end cap 118. The upper cartridge 120 has two open end caps 122. Floating collars 124, disposed between the stacked cartridges 114 and 120 and between the upper cartridge 120 and an air inlet 126 formed in the top wall 90, align the cartridges with each other and maintain concentricity between the cartridges themselves and air inlet 126.

Figure 5:
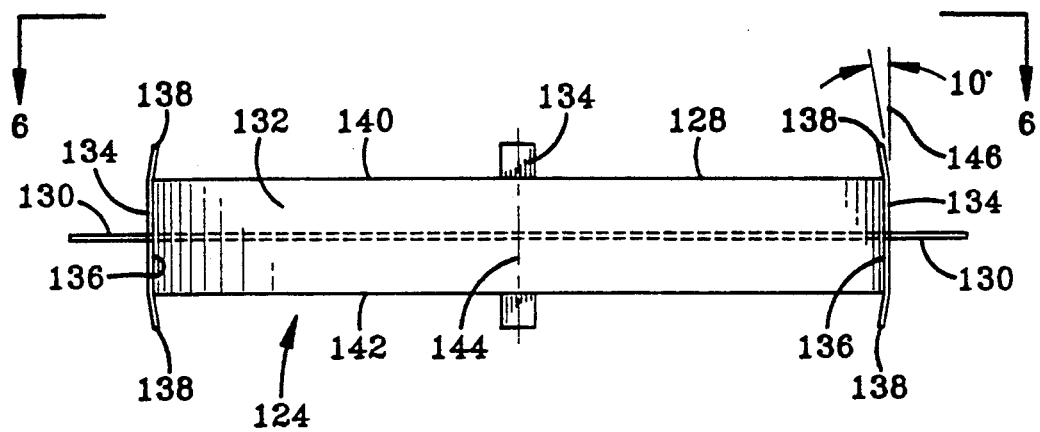
FIG. 5 is an enlarged side elevational view of an indexing collar in accordance with the present invention.
Figure 6:
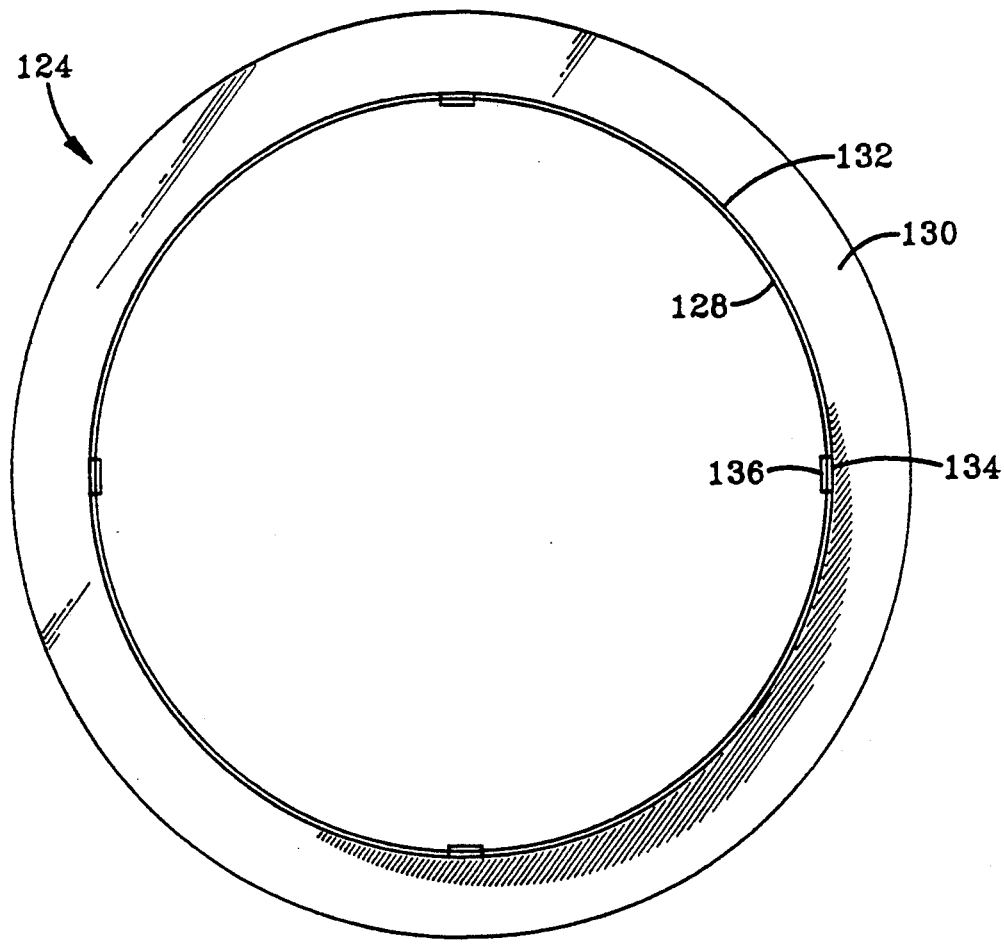
FIG. 6 is a plan view taken along lines 6—6 of FIG. 5.

Referring to FIGS. 3, 5 and 6, the floating collar 124 includes a cylindrical tube 128. A circular ring 130 extends radially outward from the outer surface 132 of tube 128 and is located at about middle of the tube 128. Indexing strips 134 are disposed about the collar, preferably about 90 degrees apart. Each of the strips includes a straight section 136 having a length which is approximately equal to the width of the tube 128. At either end of the straight section 136 is an inwardly bent section 138 extending inwardly beyond the edges 140 and 142 of the tube 128. Preferably, the bent sections extend inward towards a centerline 144 through the ring 130. The bent sections form an angle of about 5 degrees to about 15 degrees with a longitudinal axis 146 extending through the straight section 136.

Referring to FIG. 3, a gasket 148 is secured to open end cap 118 and when the cartridges are installed is disposed between open end caps 118 and 122. Ring 130 of collar 124 rests upon the end cap 118. A gasket 150 is likewise secured to open end cap 122 of the upper cartridge 120 and when the cartridges are installed is disposed between the open end cap 122 and the top wall 90. As with the collar 124 between the cartridges 114 and 120, ring 130 of collar 124 rests upon the top end cap 122. The outer diameter of the tube 128 is substantially the same as the inner diameter of end caps 118 and 222. Thus, the inwardly bent sections 138 are installed into the end caps 118, 122 between the stacked cartridges and between end cap 122 and inlet hole 126 so that the straight sections 136 establish a desired concentric relationship between the upper and lower cartridges, 120 and 114, respectively, as well as with the inlet opening 126. Inlet opening 126 can optionally be equipped with a cylindrical rim 126a having the same internal diameter as the hole in the end cap 122 to further insure concentricity.

Figure 7:
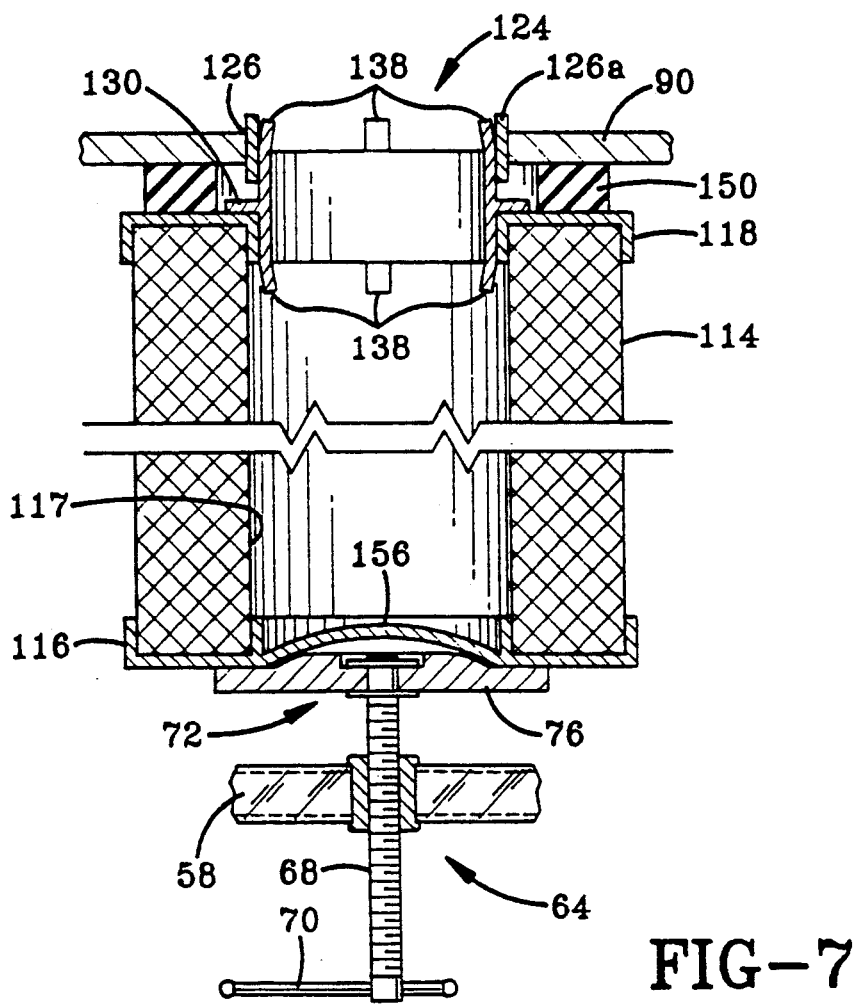
FIG. 7 is an enlarged fragmentary, cross-sectional, side elevational view of a single cartridge mounting system in accordance with the present invention.

FIG. 7 shows a single cartridge embodiment of the cartridge mounting system shown in FIGS. 3-6 for dual stacked cartridges. The same reference numerals are used in FIG. 7 for convenience e as were used in FIGS. 3-6 to identify identical items For example, lower cartridge 114 in FIG. 3 is identical to cartridge 114 of FIG. 7 as are the collar 124 which concentrically aligns single cartridge 114 with inlet hole 126, and screw device 64 which compress gasket 150 to seal cartridge 114 around inlet hole 126.

Referring again to FIGS. 1 & 2, the clean air chamber 18 includes a plurality of pulse plenum chambers 158. Each of the chambers 158 have common upper walls 160, lower walls 90 and side walls 162 and 164. Between each chamber 158 is a dividing wall 166. The chamber 18 has outer side walls 168 and 170. Two reverse pulsing valves 172, connected to a source of pressurized air (not shown), are mounted in the upper wall 160 for each of the pulse plenum chambers 158. Each valve includes a nozzle 174 aligned with the inlet openings 126 through the lower wall 90 so that pulses of air can be sequentially directed into each cartridge unit comprised of stacked cartridges 114 and 120. The valves 172 are connected by a signal line 173 to a conventional timer or controller 176 which sequences the opening and closing of the valves.

An isolation damper 178 is provided in each pulse plenum chamber 158. The damper 178 is mounted to substantially open or close an exhaust port 180 in the side wall 164 which selectively communicates with an exhaust plenum 182. The isolation damper is preferably a butterfly valve 184 with a pneumatic rotary actuator 186. Each of the dampers 178 is connected by a signal line 188 to the timer 176. Note that each damper 178 only substantially closes off the exhaust port 180 to restrict the air flow through port 180 without actually completely sealing the port 180. Thus a clearance of perhaps 3/16 of an inch is provided between the outer edge of the damper 178 and the inner circumference of the port 180 when the damper is closed. This clearance permits some air flow to move between the plenum chamber 158 and the exhaust plenum 182 when valve 174 is being pulsed to avoid a vacuum condition from occurring in plenum 158 during pulsing to allow air surrounding the top of upper cartridge 120 to be entrained with the pulse to make the pulse more effective.

Exhaust plenum 182 of clean air chamber 18 is mounted against the outer side wall 164 of the pulse plenum chambers 158. The exhaust plenum typically contains at its outlet an exhaust fan 200 to draw air from the spray booth 12 into the powder recovery chamber 16, through the cartridges 60, and pulse plenum 158, and finally through the exhaust plenum 182 and out of an exhaust opening 201 in plenum 182. Normally, a final filter 202 is provided at the exhaust plenum outlet for filtering any fine particles of powder which were not removed by the filter cartridges 60.

The operation of the powder spray system 10 is as follows. Particulate powder material is discharged from the spray guns 30 towards a substrate 34 carried by a conveyor 32 within the spray chamber 19 of powder spray booth 12. Not all of the particles of material are deposited on the substrate and the particles which are not deposited form a cloud of oversprayed powder material which is entrained in air and drawn by the exhaust fan 200 out of the spray chamber 19 into the powder recovery chamber 16. There, the particles of powder are collected on the pleated exterior of the cartridge filters 114 and 120 and the air carrying the powder is drawn into the hollow interior of the cartridge filters. This filtered air moves upwardly into the pulse plenum chambers 158, through the exhaust ports 180 and into exhaust plenum 182 where it passes through final filter 202 before being exhausted to atmosphere or recirculated back to the make up air system.

After a period of time, the cartridge filters become heavily covered with particles of powder and must be cleaned in order to maintain filter efficiency. The cleaning operation is performed when timer 176 signals one of the butterfly valves 184 to close, about once every three minutes, for about five to ten seconds. Once the valve is closed, its pulse plenum chamber 158 is isolated to a great extent from the exhaust air flow being drawn into the exhaust plenum 182 by fan 200, since the damper or valve 184, when in the closed position, substantially restricts the amount or flow rate of air through port 180. After the valve 184 has closed, the timer 176 signals the pulse valves 172 to open and direct a high pressure pulse of air from the nozzle 174, during the middle of the time period when the valve 184 is closed, downwardly into the cartridges 114,120. The air pulse causes the powder particles to be knocked or pulsed off of the cartridges' exterior to fall into the hopper 48 below. The sheets 108 of polypropylene between the cartridge filters 60 in the enclosures 92-106, because of their movement in response to the pulse and slippery surface, do not attract or retain the particles and enhance the free fall of powder particles towards the hopper below. Moreover, the sheets 108 prevent the powder from being pulsed onto the adjacent cartridges in FIG. 2. Also, since the stacked cartridges are located in separate enclosures 92-106 and the exhaust air is restricted through whichever of the enclosures 92-106 is connected to the pulse plenum chamber 158 which has been isolated by a closed damper 184, the powder particles just cleaned off the outer surface of the cartridge are not drawn right back onto the same cartridge or another adjacent cartridge within the same enclosure 92-106 at the termination of the pulse.

While the isolation of the filters during the pulse cleaning as described above is extremely effective because the exhaust fan draw on the cartridges is reduced during pulsing in such a way that air surrounding the top of the cartridges can be entrained in the pulse, it is still necessary to periodically replace the filters because of their gradual deterioration and/or malfunction. To install or replace the cartridges of the FIG. 3 embodiment, the device 64 is unscrewed so that the stacked cartridges 114 and 120 drop downwards and tilted for easy removal from the spray booth side of the system 10 or from access doors which could be provided through rear wall 188. Then, a cartridge 114 having a collar 124 resting on its open end cap 118 is placed on the pressure plate 72. Next, a collar 124 is placed on the upper, open end cap 122 of a cartridge 120. Cartridge 120 is now stacked onto the lower cartridge 114 so that its open bottom end cap 122 slides over the inwardly bent sections 138 of collar 124 Finally, the screw drive 64 is rotated to move the plate 76 upwardly against the surface 156 of the closed end cap 116 so that the stacked cartridges are moved upwardly so that the inwardly bent sections 138 of upper collar 124 move into the opening 126 of the pulse plenum 158 The screw drive is turned until the cartridges adequately compress the gaskets 148 and 150 while simultaneously retaining a concentric relationship because of the floating collars 124. Likewise, to install the cartridge 114 of the FIG. 7 embodiment, a collar 124 is placed on the top open end cap 118, and bottom end cap 116 is set upon plate 76 of screw device 64. Handle 70 of screw device 64 is then turned to insert the collar 124 through inlet opening 126 until gasket 148 is sufficiently compressed to seal cartridge 114 against plenum inlet opening 126.

In addition to providing for more effective cleaning of the cartridges in the respects noted above, another advantage of this novel cartridge pulsing and mounting system is that not only is the pulsing more effective due to isolation of the pulse plenum, but also this cartridge mounting system keeps the top opening of the cartridge which seals against the pulse plenum virtually completely open to the pulse with no shadowing of the pulse by cartridge support hardware. Thus, virtually the entire length of the cartridge including the uppermost portion immediately adjacent the pulse plenum can be effectively cleaned by the pulse.

Moreover, given the fact that the invention provides a securely supported and sealed cartridge which presents virtually no supporting hardware obstructions at the top end, together with the isolation feature of the invention which slows down the rate of filtered air up through the cartridge during pulsing, the pulse energy needed to deliver an effective cleaning pulse into the cartridge is reduced. Reducing this required pulse energy reduces the energy requirements of the system and also reduces the noise level of the pulse which is a significant advantage in powder coating operations.

Further, the pulsing and mounting features of the present invention include a novel alignment device which achieves concentricity between stacked cartridges or between a filter cartridge and the clean air plenum without substantially restricting the air flow through the top or bottom of a cartridge by cartridge support hardware.

The patents disclosed herein are intended to be incorporated in their entireties by reference hereto.

It is apparent that there has been provided in accordance with this invention an apparatus and method for cleaning and mounting the cartridge filters of a powder collection unit in a powder spray system that satisfy the objects, means and advantages set forth hereinbefore. While the invention has been described in combination with embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

We claim:

1. A powder spray system for powder coating of substrates in a spray booth, comprising:
    a powder recovery chamber having a first exhaust opening and a plurality of air inlet openings, said recovery chamber including a plurality of filter cartridges mounted to said air inlet openings and adapted to collect air-entrained, oversprayed powder drawn through said first exhaust opening from said spray booth;
    a plurality of pulse plenum chambers each having an exhaust port and being connected to at least one of said air inlet openings, each of said pulse plenum chambers having one or more of said filter cartridges connected to it and each having an air pulse generating means therein for directing a pulse of air through said at least one of said air inlet openings and into said one or more filter cartridges;
    an exhaust plenum means having a second exhaust opening and communicating with each of said pulse plenum chambers and associated with an exhaust fan means for drawing the air-entrained, oversprayed powder through said first exhaust opening and into said powder recovery chamber so that said oversprayed powder is collected on said filter cartridges and filtered air is drawn through the plurality of separate pulse plenum chambers and into said exhaust plenum means and out of said second exhaust opening; and
    means for selectively restricting the amount or flow rate of said filtered air which is being drawn through one of said pulse plenum chambers and into said exhaust plenum means by said exhaust fan means without completely stopping said amount or flow rate of said filtered air when said pulse generating means, within said one of said pulse plenum chambers, directs said pulse or air into said one or more of said filter cartridges which are connected to said one of said pulse plenum chambers.

2. The system of claim 1 wherein said means for selectively restricting the flow of said filtered air through one of said pulse plenum chambers into said exhaust plenum means includes valve means for selectively opening or restricting air flow between each of said pulse plenum chambers and said exhaust plenum means.

3. The system of claim 2 wherein said valve means comprises a butterfly valve installed in each said exhaust port between each of said pulse plenum chambers and said exhaust plenum means, said butterfly valve being moveable from an open position where said flow of said filtered air is substantially unrestricted to a closed position where said flow of said filtered air is restricted without completely sealing off each said exhaust port.

4. The system of claim 2 wherein said means for selectively restricting said flow of said filtered air through one of said pulse plenum chambers into said exhaust plenum means includes timer means for signaling said valve means to selectively open or restrict said flow of said filtered air between each of said pulse plenum chambers and said exhaust plenum means and to signal the pulse generating means within the pulse plenum chamber having restricted flow of said filtered air with said exhaust plenum means to direct said pulse of air into said one or more cartridges connected to said pulse plenum chambers having said restricted flow.

5. The system of claim 3 wherein a clearance is provided between said butterfly valve and said exhaust port when said valve is in said closed position.

6. A powder spray system for powder coating of substrates in a spray booth, comprising:
   a powder recovery chamber having a first exhaust opening and a plurality of air inlet openings, said recovery chamber being divided into a plurality of separate enclosures each having at least one filter cartridge therein mounted to one of said plurality of air inlet openings and adapted to collect air-entrained, oversprayed powder drawn through said first exhaust opening from said spray booth;
   a plurality of pulse plenum chambers, each having an exhaust port and being connected to at least one of said air inlet openings for communicating with one of said separate enclosures and having an air pulse generating means therein for directing a pulse of air through said at least one of said air inlet openings and into said at least one filter cartridge;
   an exhaust plenum means having a second exhaust opening communicating with each of said pulse plenum chambers and associated with an exhaust fan means for drawing the air-entrained, oversprayed powder through said first exhaust opening and into said plurality of separate enclosures so that the oversprayed powder is collected on said at least one filter cartridge in each of said enclosures and filtered air is drawn through said plurality of separate pulse plenum chambers and into said exhaust plenum means and out of said second exhaust opening; and
   means for selectively restricting the amount or flow rate of said filtered air which is being drawn through one of said pulse plenum chambers and into said exhaust plenum means by said exhaust fan means without completely stopping said amount or flow rate of said filtered air when said pulse generating means, within said one of said pulse plenum chambers, directs said pulse of air into said at least one filter cartridge which is connected to said one of said pulse plenum chambers.

7. The system of claim 6 wherein said means for selectively restricting said amount or flow rate of said filtered air through one of said pulse plenum chambers into said exhaust plenum means includes valve means for selectively opening or restricting air flow between each of said pulse plenum chambers and said exhaust plenum means.

8. The system of claim 7 wherein said valve means comprises a butterfly valve installed in said exhaust port between each of said pulse plenum chambers and said exhaust plenum means, said butterfly valve being moved from an open position where said air flow is substantially unrestricted to as closed position where said air flow is restricted.

9. The system of claim 7 wherein said means for selectively restricting the air flow through one of said pulse plenum chambers into said exhaust plenum means includes timer means for signaling said valve means to selectively open or restrict said air flow between each of said pulse plenum chambers and said exhaust plenum means and to signal the pulse generating means within the pulse plenum chamber having restricted communication with said exhaust plenum means to direct said pulse of air into said at least one cartridge which is connected to said pulse plenum chamber having restricted air flow.

10. The system of claim 8 wherein a clearance is provided between said butterfly valve and said exhaust port when said valve means is in said closed position.

11. The system of claim 6 wherein said separate enclosures of said powder recovery chamber are divided from one another by a flexible material.

12. The system of claim 11 wherein said flexible material is slippery and nonconductive.

13. The system of claim 12 wherein said slippery nonconductive, material is polypropylene.

14. A method of dislodging particles of powder material from the exterior of at least one cartridge filter in the powder recovery unit of a powder spray system, comprising the steps of:
   directing a flow or air-entrained particles of powder material to the exterior of the at least one cartridge filter so that the particles of powder material collect on the exterior and the air passes through the exterior and enters a hollow interior of the at least one cartridge filter forming filtered air;
   moving the filtered air through the hollow interior of the at least one cartridge filter toward an open top thereof;
   periodically reducing the flow rate of filtered air through the hollow interior of the at least one cartridge filter; and
   directing a pulse of air into the open top of the at least one cartridge filter, in a direction opposite to the normal direction of movement of the filtered air within the hollow interior of the at least one cartridge filter, when the flow rate of the filtered air through the hollow interior of the at least one cartridge filter is reduced but not stopped to pulse collected powder off the exterior of the cartridge filter.

15. The method of claim 14 further comprising the step of:
   blocking powder which has just been pulsed off of one cartridge filter from immediately being drawn on to an adjacent cartridge filter so that said powder can more easily fall into a collection hopper.

16. A powder recovery chamber, comprising an enclosure having a top wall with an inlet opening therethrough at one end, side walls and an opening at the other end;
   a cartridge filter disposed vertically and located between the top wall and the opening at the other end, said cartridge filter including an elongated, hollow member formed of filter media and a closed end cap on one end and an open end cap on the other end;

a gasket between said open end cap and said top wall, said gasket surrounding the inlet opening in said top wall;

means installed into said open end cap and said inlet opening through said top wall for aligning the cartridge filter to be concentric with the inlet opening; and means compressing said gasket between said top wall and said open end cap for securely mounting said filter cartridge with said enclosure.

17. The powder recovery chamber of claim 16 wherein said compressing means comprises a rod supported by a frame member which extends along said other end of said enclosure, said rod being substantially coaxially located with respect to said filter cartridge, and means for forcing said rod against said closed end cap.

18. The powder recovery chamber of claim 17 wherein said filter cartridge is formed of two separable, end-to-end hollow members comprising an upper filter member and a lower filter member, said upper filter member having an upper open end cap and a lower open end cap, said lower filter member having an upper open end cap and a lower closed end cap, a gasket being provided between said upper open end cap of said upper filter member and said top wall, and a gasket being provided between said lower open end cap of said upper filter member and said upper open end cap of said lower filter member.

19. The powder recovery chamber of claim 18 including means installed within said lower open end cap of said upper filter member and installed within said upper open end cap of said lower filter member for aligning said upper filter member and said lower filter member to be concentric with each other.

20. The powder recovery chamber of claim 16 wherein the means for aligning the cartridge filter with the inlet opening through said top wall comprises a floating collar having a cylindrical tube adapted to be slidingly received within the pen end cap of said cartridge filter, a circular ring extending radially from the cylindrical tube adapted for resting engagement on the open end cap and indexing strips disposed about said tube and extending longitudinally outward from opposite ends of the tube for guiding the cylindrical tube into the open end cap and the inlet opening through said top wall.

21. The powder recovery chamber of claim 19 wherein the means for aligning the upper and lower filter member with each other and with the inlet opening through said top wall comprises first and second floating collars each having a cylindrical tube adapted to be slidingly received within said inlet opening through said top wall and said open upper end cap of said upper filter member, and within said lower open end cap of said upper filter member and said upper open end cap of said lower filter member, respectively, a circular ring extending radially from the cylindrical tube adapted for resting engagement on the upper open end caps of the upper and lower filter members and indexing strips disposed about said tube and extending longitudinally outward from opposite ends of the tube for guiding the cylindrical tube into said lower open end cap of said upper filter member and said upper open end cap of said lower filter member and into said inlet opening through said top wall and said open upper end cap of said upper filter member.

22. A powder recovery chamber, comprising:

an enclosure having a top wall with an inlet opening therethrough at one end, side walls and an opening at the other end;

an upper cartridge filter disposed vertically and located adjacent the top wall, said upper cartridge filter including an elongated, hollow member formed of filter media, a top open end and a bottom open end;

a lower cartridge filter disposed vertically and located below said upper cartridge filter, said lower cartridge filter having a top open end and a bottom closed end;

a first gasket between said top open end of said upper cartridge filter and said top wall, said first gasket surrounding the inlet opening in said top wall;

a second gasket between said bottom open end of said upper cartridge filter and said top open end of said lower cartridge filter, said second gasket surrounding said bottom open end of said upper cartridge filter and said top open end of said lower cartridge filter;

means projecting into said top open end of said upper cartridge filter and into said inlet opening through said top wall for aligning said upper cartridge filter to be concentric with said inlet opening;

means projecting into said bottom open end of said upper cartridge filter and into said top open end of said lower cartridge filter for aligning said lower cartridge filter to be concentric with said upper cartridge filter; and means comprising said first gasket between said top wall and said top open end of said upper cartridge filter and said second gasket between said upper cartridge filter and said lower cartridge filter for securely mounting said upper and lower cartridge filters within said enclosure.

23. The powder recovery chamber of claim 22 wherein said compressing means comprises a rod supported by a frame member which extends across said other end of said enclosure, said rod being substantially coaxially located with respect to said upper and lower cartridge filters, and means for forcing said rod against said bottom closed end of said lower cartridge filter.

24. The powder recovery chamber of claim 22 wherein the means for aligning the upper and lower cartridge filters with each other and the upper cartridge filter with the inlet opening through said top wall comprises first and second collars each having a cylindrical tube adapted to be slidingly received within the inlet opening through said top wall and said top open end of the upper filter, and within the bottom open end of the upper filter and the top open end of the lower filter, respectively, a circular ring extending radially from the cylindrical tube adapted for resting engagement on the top open end of the upper and lower cartridge filters; and indexing strips disposed about said tube and extending longitudinally outward from opposite ends of the tube for guiding the cylindrical tube into said bottom open end of said upper filter and said top open end of said lower filter and into said inlet opening through said top wall and said top open end of said upper filter.

25. The powder recovery chamber of claim 23 wherein said rod is threadedly engaged to said frame member and has a plate at one end engageable with said closed bottom end of said lower cartridge filter.

26. The powder recovery chamber of claim 16 wherein said inlet opening through said top wall is an inlet opening into a pulse plenum chamber, said pulse plenum chamber having an air pulse generating means therein for directing a pulse of air into said cartridge filter which is secured against said inlet opening through said top wall.

27. The powder recovery chamber of claim 26 further comprising an exhaust fan communicating with said pulse plenum chamber for drawing air entrained, oversprayed powder into said powder recovery chamber so that the oversprayed powder is collected on said cartridge filter and filtered air is drawn through said cartridge filter into said pulse plenum chamber, and means for selectively restricting the amount or flow rate of air which is being drawn through said pulse plenum chamber by said exhaust fan when said pulse generating means directs a pulse into said cartridge filter which is connected to said pulse plenum chamber.

28. The powder recovery chamber of claim 22 wherein said inlet opening through said top wall is an inlet opening into a pulse plenum chamber, said pulse plenum chamber having an air pulse generating means therein for directing a pulse of air into said cartridge filter which is secured against said inlet opening through said top wall.

29. The powder recovery chamber of claim 28 further comprising an exhaust fan communicating with said pulse plenum chamber for drawing air entrained, oversprayed powder into said powder recovery chamber through said exhaust opening so that the oversprayed powder is collected on said cartridge filter and filtered air is drawn through said cartridge filter into said pulse plenum chamber, and means for selectively restricting without completely stopping the amount or flow rate of said filtered air which is being drawn through said pulse plenum chamber by said exhaust fan when said pulse generating means directs a pulse or air into said cartridge filter which is connected to said pulse plenum chamber.

30. An alignment device for cartridge filters in a powder coating system, comprising:

a collar having a member adapted to be slidingly received within an open end cap of a cartridge filter and within the inlet opening to a clean air plenum, wherein said member includes indexing strips extending from the opposite ends of the said member for guiding said member into said open end cap and said inlet opening; and means to restrain lateral movement of the alignment device along the longitudinal axis of the cartridge filter when the cartridge filter is supported against the clean air plenum.

31. The alignment device of claim 30 wherein said member is a cylindrical tube.

32. The alignment device of claim 30 wherein said means to restrain is a circular ring extending radially from said member for resting engagement between said clean air plenum and said cartridge filter end cap.

33. The alignment device of claim 30 wherein said member includes indexing strips extending from the opposite ends of the said member for guiding said member into said open end cap and said inlet opening.

34. The alignment device of claim 33 wherein said indexing strips comprise one or more inwardly bent sections which extend inward towards the centerline of said alignment device.

35. An alignment device for cartridge filters in a powder coating system comprising a collar having a member adapted to be slidingly received within an open end cap of a first cartridge filter and within an open end cap of a second cartridge filter, wherein said member includes indexing strips extending from the opposite ends of said member for guiding said member into said open end cap of said first cartridge filter and into said open end cap of said second cartridge filter; and means to restrain lateral movement of the alignment device along the longitudinal axis of the first and second cartridge filters when the first cartridge filter is supported against the second cartridge filter.

* * * * *